E. J. SCHEETZ.
BEET HARVESTER.
APPLICATION FILED SEPT. 11, 1912.
1,173,042.
Patented Feb. 22, 1916.
3 SHEETS—SHEET 3.
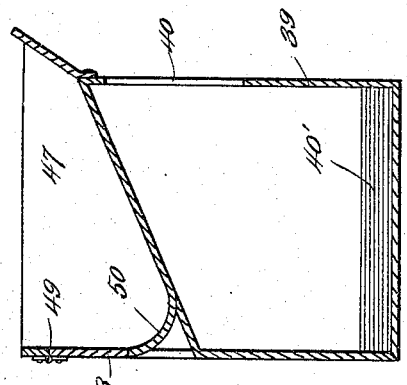
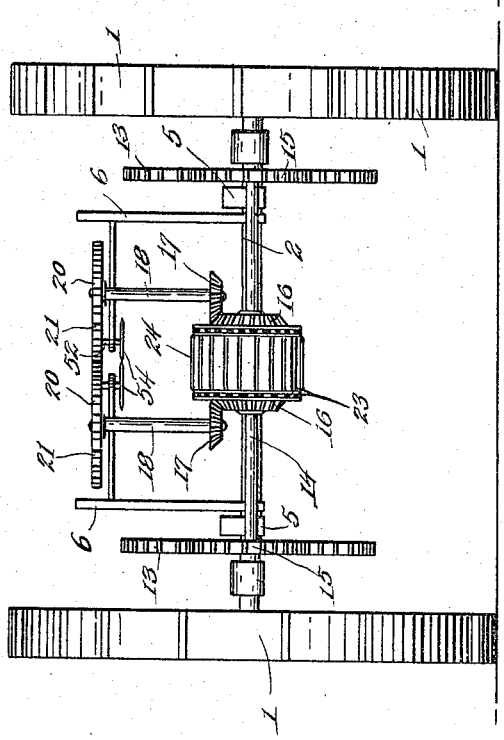

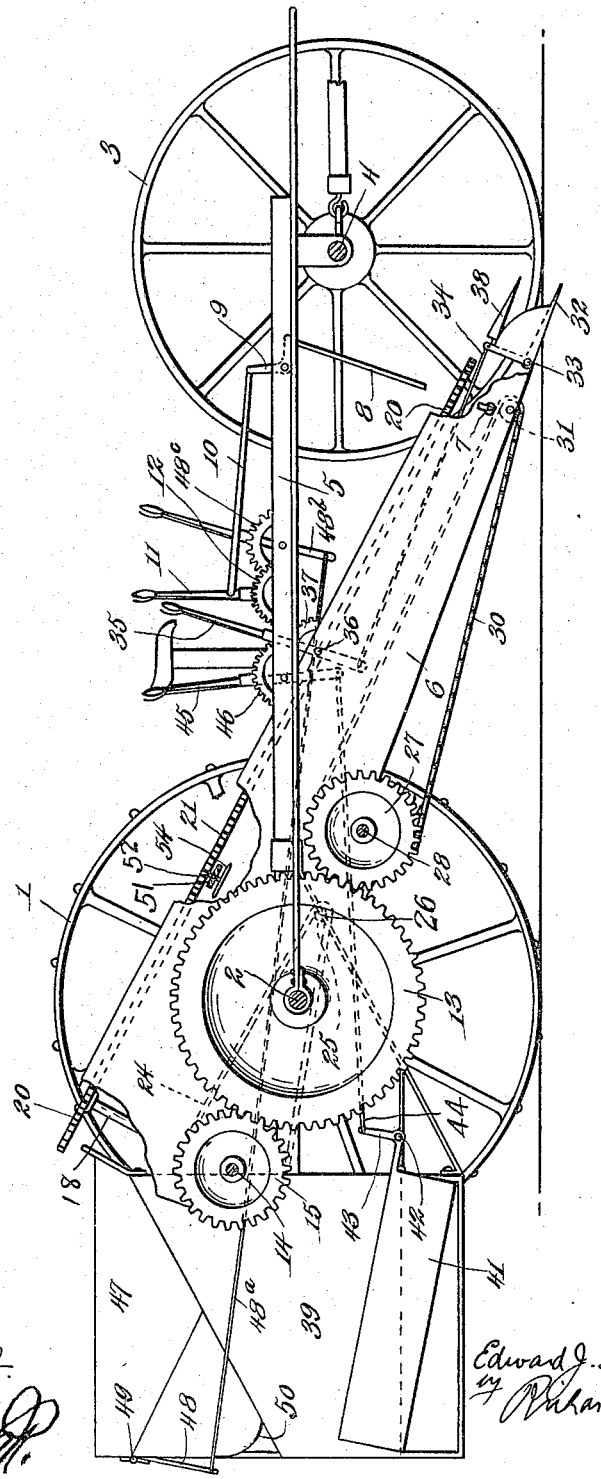

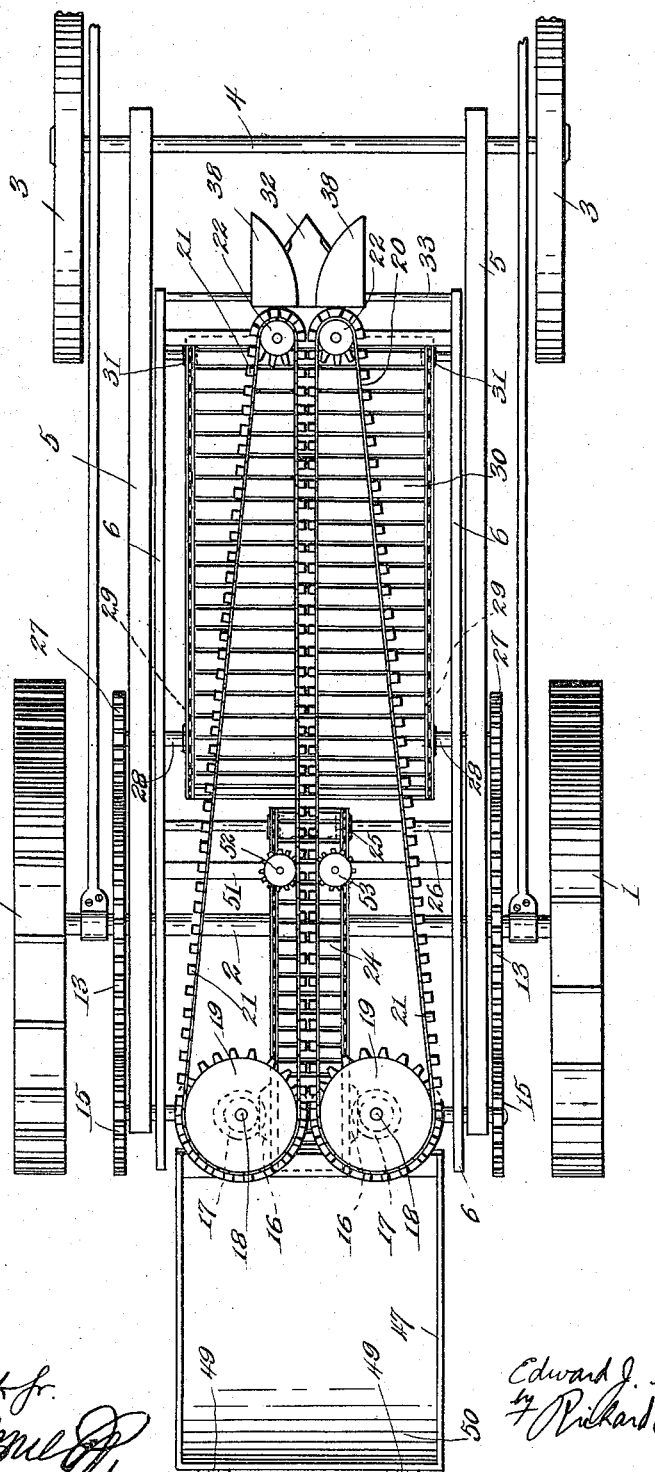

UNITED STATES PATENT OFFICE.

EDWARD J. SCHEETZ, OF MONTROSE, COLORADO.

BEET-HARVESTER.

1,173,042.  Specification of Letters Patent.  Patented Feb. 22, 1916.

Application filed September 11, 1912. Serial No. 719,704.

*To all whom it may concern:*

Be it known that I, EDWARD J. SCHEETZ, a citizen of the United States, residing at Montrose, in the county of Montrose and State of Colorado, have invented new and useful Improvements in Beet-Harvesters, of which the following is a specification.

My invention relates to a beet harvester.

An object of my invention is to generally improve the construction of a device of this kind having means to dig the beets and to top or cut the leaves therefrom by passage through the harvester.

The minor objects of the invention will appear from the description hereinafter following, taken in connection with the accompanying drawings, wherein—

Figure 1 is a side elevation. Fig. 2 is a plan view, minor parts being omitted for the sake of clearness. Fig. 3 is a rear view of the drive mechanism, and Fig. 4 is a detail vertical sectional view through the receptacles for the beets and the leaves topped from the same.

Referring to the drawings 1 designates traction or drive wheels rigidly mounted upon an axle 2 so that the shaft 2 will be driven thereby. The front wheels are designated 3 and suitably supported upon an axle 4. The harvester is adapted to be propelled in any suitable manner as by means of an engine and suitable connection or by suitable draft means. The axles 2 and 4 support a suitable frame designated 5, from which the various parts of the harvester are supported.

A body or casing designated 6 houses especially at the sides, suitable beet elevating mechanism hereinafter described, which casing is pivotally or loosely mounted upon the shaft 2 at one end and at its opposite end is pivoted at 7 to a rod 8, which rod 8 is in turn pivoted to a bell crank lever 9. Said bell crank lever 9 is pivoted to a rod 10 which is also pivoted to a lever 11. The lever 11 is provided with the usual spring pressed plunger adapted to engage a toothed segment 12. By adjustment of the lever 11 the rods 8 and 10 and bell crank 9 enable the casing to be adjusted in a vertical plane or relatively to the ground.

On the shaft 2 at opposite sides thereof and exterior of the casing 6 are provided gear wheels 13. A shaft designated 14 is journaled on the casing 6 and has mounted thereon gear wheels 15 adapted to mesh with the gear wheels 13. The shaft 14 is provided with beveled gear wheels 16, which mesh with similar gear wheels 17 rigidly mounted on suitably supported shafts 18 having mounted at their upper ends gear wheels 19. Said sprocket wheels 19 drive sprocket chains 20 provided with suitable blocks or the like 21 thereon. Said sprocket chains at the front of the machine engage idler sprocket wheels 22. As shown, the chains 20 at the center are relatively close together, and are maintained parallel thereat.

On the shaft 14 are provided sprocket wheels 23 adapted to drive sprocket chains of a riddle conveyer 24 for beets, the chains of which beet conveyer belt at the other end pass over idlers or similar wheels 25, mounted on a suitably supported shaft 26.

A gear wheel 27 is mounted on a shaft 28 and is in mesh with and driven from the gear wheel 13. On said shaft 28 are mounted sprocket wheels 29 or the like, which drive sprocket chains on a riddle conveyer 30, which chains, also pass over idler wheels 31 secured to the casing 6 adjacent its forward end.

The several conveyer belts, although they may be of any suitable construction, are preferably riddle belts comprising sprocket chains which support a plurality of transverse bars as shown.

A shoe or digger designated as an entirety by the numeral 32 is pivoted as at 33 to the forward end of the casing 6. Said shoe or digger 32 may be said to consist of a base plate adapted for penetrating engagement with the soil, and diverging sides integral with the base plate, the mentioned sides acting as guides for the beets extracted during advancement of the plow. As shown, the said digger has connected thereto a rod 34 which is in turn connected to a lever 35 pivoted to the casing at 36 and having the usual plunger to engage a toothed segment 37, whereby the shoe may be adjusted to the desired depth of penetration into the ground. On the shoe or casing are provided a plurality of fenders 38 which, adjacent the center of the conveyer belts 20, are relatively close together and flared so that beet leaves will be guided together by said fenders and into position to be engaged by the belts 20.

The numeral 39 designates a hopper or receptacle to which the beets are conveyed by the chain or conveyer 24, and to this end said conveyer 24 extends through an opening 40 in the hopper 39. Said hopper 39 is preferably provided with a floor 40', inclining as shown in Fig. 4, toward an opening provided with an exterior door 41 as shown in Fig. 1. Said door 41 is pivoted to a bracket at 42 and has an arm 43 thereon to which is connected a rod 44 which is also connected to a lever 45 having the usual plunger to engage a toothed segment 46. It will be seen that by the operation of the lever 45 and intermediate parts connecting the same with the door 41, the door 41 may be adjusted to open or close the opening of the receptacle 39. Above and on the receptacle 39, which is closed at the top as shown, is provided a receptacle 47 open at the top, provided with a door 48 hinged at 49 and a curved bottom portion 50. The door 48 is connected to a rod 48$^a$ which is connected to a lever 48$^b$, having the usual spring pressed plunger adapted to engage a toothed segment 48$^c$. By this means the door 48 may be opened or closed. The chains or belts 20 extend above and part way over the edge of the receptacle 47.

Over the conveyer 24 are journaled in transverse bars 51 of the frame, suitable shafts 52 on which are mounted sprocket wheels 53 adapted to engage and be driven from the belts or sprocket chains 20. Said shafts at their lower extremity are provided with circular cutters designated 54.

In operation the shoe or digger 32 is adjusted to the desired depth of penetration into the soil so that the same will extend below the beets to be harvested and will dig said beets as the vehicle passes along a row. The leaves are guided between the fenders 38 and between the chains or belts 20, being grasped between the same by means of blocks 21. Said belts or conveyers carry the beets with the leaves thereon to the cutters or knives 54, which are rotated by the conveyers or chains, whereby the tops or leaves of the beets are cut off. Thereupon the beets fall onto the conveyer 24 which is driven through the connection described and are carried by the conveyer 24 into the receptacle 39 where they may be removed therefrom through the door 41 which is operable as described. Upon the topping of the beets, the tops or leaves remain supported between the chains or conveyers 20 and are carried to the rear of the machine and discharged into the receptacle 47, being removable therefrom through the door 48. The leaves or tops are removed from the receptacle 47 by hand and to this end the curved portion 50 is provided which enables the leaves or tops to be more readily removed from the receptacle. With the grasping of the beet leaves or tops by the conveyers the dirt dug by the digger 32 passes up onto the conveyer 30 and falls therefrom back onto the earth as the conveyer 30 passes over the sprocket wheel 29.

It will be seen that most of the harvesting mechanism is supported from the casing and that the same may be adjusted and at the same time the harvesting parts be effective for operation in connection with the various adjusted positions of the casing, in a vertical plane. It will also be seen that the digger may be adjusted so as to accommodate for digging beets at various depths.

It is to be understood that the device herein described and illustrated in the accompanying drawings is my preferred form and that changes of the details of construction thereof may be made without departing from the spirit and scope of the appended claim.

Having thus fully described my said invention, what I claim and desire to secure by Letters Patent, is:—

In a beet harvester, extracting mechanism including a plow structure comprising a base plate adapted for penetrating engagement with the soil, diverging sides integral with the base plate and forming guides for the beets extracted during advancement of the plow, opposed guide members arranged in superimposed relation to the base plate for directing the beet tops in a defined path, a support for the plow structure, means to adjust the plow structure relatively to the support, and means to adjust the support and the plow structure therewith.

EDWARD J. SCHEETZ.

Witnesses:
B. H. FEDLER,
HERMAN T. X DOREI.
         his
         mark

Witness to mark:
W. O. REDDING.